Patented Mar. 8, 1938

2,110,608

UNITED STATES PATENT OFFICE 2,110,608

INSECTICIDES

Warren Moore, Richmond, and Robert B. Arnold, Henrico County, Va., assignors to Tobacco By-Products and Chemical Corporation, Louisville, Ky., a corporation of Delaware No Drawing. Application February 28, 1934, Serial No. 713,264

6 Claims. (Cl. 167—34)

The present invention relates to a spreader and sticker for insecticides or fungicides and to new insecticides developed from such spreader, as well as the process of making the same.

In preparing aqueous solutions or suspensions for use as contact insecticide sprays, particularly for plants, it is common to add a suitable soap to serve as a spreader. Such a soap, where soft water is used in making the spray, and where the spray solution contains no soluble compounds of the alkaline earth or heavy metals, is very effective, because it lowers the surface tension of the liquid spray and thus causes the latter to spread over the leaves, fruit or stems of the plant. However, where the spray solution contains soluble compounds of the alkaline earth or heavy metals, added, as in the case of Bordeaux mixture or lime sulphur, or present because the water used is hard, any soap added to such spray solution is wholly or partly converted to an insoluble soap and causes much trouble, not only on account of clogging of the spray apparatus, but on account of flocculation and loss of the spreading power. The use of soap as a spreader is thus commercially limited to contact insecticides when applied alone, and since it is not practicable, in most localities in the United States to obtain water free from soluble alkaline earth compounds such as, for example, soft rain water or distilled water, much trouble has been encountered in the use of soap in this limited field. Attempts have been made to use materials other than soap as spreaders, for example, oils and oxidized oils, but such materials have not been satisfactory on account of increased cost and lack of compatibility with other spray materials, notably the sulphur fungicides, where their presence causes injury to foliage and fruit.

Applicants have discovered a relatively inexpensive material which is non-injurious to plants, even in the presence of sulphur compounds, and highly efficient, not only as a spreader for insecticides but also as a sticker for those insecticidal or fungicidal solutions which contain copper or calcium compounds. The said material may be designated as ammonium or alkali salts or sulphonates of hydrocarbons, the term sulphonates being used in a generic sense, as is done in the commercial art, and including not only the compounds which are the true sulphonates of chemistry, but also the sulphuric acid compounds of unsaturated chain, or alkyl, compounds.

This material is a by-product of certain mineral oil-refining processes. In the purification of petroleum hydrocarbons known as mineral oils, it is common to subject certain distillates to the action of sulphuric acid for the purpose of removing any unsaturated hydrocarbons, which are attacked by strong sulphuric acid and converted into sulphuric esters or sulphonic acids, these being recovered as a mixture of hydrocarbon sulphonates and sulphates of sodium, potassium, ammonium, and the like, which are now available commercially. The said sulphonates may be represented by the generic formula R.—$SO_3M$. and the sulphates by the generic formula R.—$SO_4M$. in which formulae R indicates any hydrocarbon radical having the large number of carbon atoms which exist in liquid hydrocarbons and M indicates sodium, potassium, or other monovalent metal, or ammonium.

It is likely that the mixture of hydrocarbon sulphonates and sulphates such as above referred to are derived chiefly, if not entirely, from unsaturated hydrocarbons, some of which are olefines, but on account of the vigor of the treatment the resultant mixture of various hydrocarbon sulphonates and sulphates are mostly acyl and alkyl sulphonates, mixtures of which are dispersible in water, since the soluble components tend to peptize the insoluble components.

It has been found that the hydrocarbon ammonium compounds hereinbefore referred to are readily and completely peptized by water, that is, are dispersed in water in particles of colloidal size, whereas the corresponding compounds of potassium, sodium and calcium are not completely peptized. We have found that when such a mixture of hydrocarbon sulphonates or hydrocarbon sulphates of the alkalis or of ammonium is added to an insecticidal spray solution, it serves as an excellent spreader and its spreading power is not appreciably injured by the presence of alkaline earth compounds in the water. Hence, such material may be added also to fungicidal sprays, or to mixtures of insecticidal and fungicidal sprays, with assurance of success.

When using the material in this way it may be added in the proportions of 0.1 to 0.5 percent of the spray solution.

We have found also that the above-mentioned property of hydrocarbon sulphonates and sulphates of ammonium of dispersing completely in water, coupled with the further property of reacting directly and readily with a nicotine salt, or nicotine, to exchange the ammonium for nicotine, makes possible the production of a valuable nicotine insecticide material.

Nicotine acts as a mono-acid base, and, hence, will bind one molecule of an alkyl sulphuric ester, and at normal temperatures, that is between 10° and 35° C., alkyl ammonium sulphate and a nicotine salt, for example, nicotine sulphate, will interchange their bases, probably according to the following equation:

$$2(RSO_4NH_4) + (Nicotine)_2H_2(SO_4) =$$
$$2(RSO_4)H \text{ Nicotine} + (NH_4)_2SO_4$$

Also under the same conditions hydrocarbon ammonium sulphonate and nicotine sulphate will react according to the following equation:

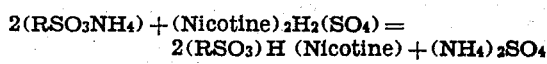

In these formulae R represents the radical of a hydrocarbon or derivative thereof having a large number of carbon atoms and the name "nicotine" is used in place of the chemical formula therefor, for the sake of simplicity. If nicotine in free form be used, the reaction would be as follows:

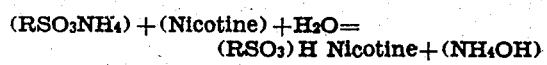

For the sake of brevity, and, in accordance with industrial usage, the reaction products of a base with a mixture of hydrocarbon sulphuric esters and hydrocarbon sulphonic acids will be termed hydrocarbon sulphonates.

The method of making the insecticide material in the tank of the usual spray machine will now be described in connection with the following example.

To 100 gallons of water there is added 0.12 to 0.50 percent by weight (about 1 to 4 pounds) of the commercial hydrocarbon ammonium sulphonates, which commercial material usually carries about 50% dry matter and 50% water. This material readily disperses in the water, and may be assisted by some agitation. With the agitator in operation, there is added slowly enough of the usual nicotine sulphate of 40% nicotine strength, to amount to about 0.05% nicotine by weight, the agitation being maintained for a few minutes after all the nicotine sulphate has been added. At the completion of the reaction the water in the tank will contain hydrocarbon nicotine sulphonates, in very finely dispersed colloid form.

In general, the range of proportions of the hydrocarbon ammonium sulphonate mixture allows for an excess of nicotine, in which case the final product contains not only the hydrocarbon nicotine sulphonates but also some nicotine sulphate, and in all cases has ammonium sulphate in solution.

The insecticide product obtained as above described is very efficient as a spray for plants because of the excellent dispersion of the nicotine sulphonates and the low surface tension of the liquid. Futhermore, the nicotine in the sulphonates is only slightly volatile, so that the insecticide will remain effective as a film, poisonous to insects, for a much longer time than will nicotine sulphate; in some cases as much as a month, unless, of course, it is washed off the plant by rain.

Where the spray contains some excess nicotine sulphate, this excess is rendered substantially non-volatile, as the sulphonates which are present exert a shielding action on it, and apparently hold back any nicotine which would otherwise vaporize. Both the nicotine sulphonates and the sulphonates of many metals, including ammonium, are surface tension depressants and sprays containing them give excellent spread and wetting of foliage.

An example of the dual function of this new insecticide, i. e. the holding of the nicotine and the spreading of the spray solution on the foliage, is found in its ability to control the European corn borer on corn and dahlias. To effectively control this borer it is necessary that the insecticide shall not only be maintained as a poisonous film but also that it spread or flow into small crevices such as the one formed where the leaf or blade joins a corn stalk. Outstanding results have been obtained against the European corn borer with a spray consisting of one volume of a hydrocarbon ammonium sulphonate (50% solution) and one volume of nicotine sulphate containing 40% of nicotine, or an equal quantity of nicotine as nicotine tannate, to 800 volumes of water.

An insecticide material of the type hereinbefore described not only is compatible with lime-sulphur or other calcium, magnesium, potassium or sodium carrying material, but where the hydrocarbon ammonium sulphonate is present in substantial amount, gives a composition which has the important additional advantage that some of the ammonium sulphonate will react with the alkaline earth or alkali metal to form a sticky substance which aids in causing the hydrocarbon nicotine sulphonate to adhere to the plant to which it is applied.

Therefore, where it is desired to combine with the insecticide material the usual fungicides such as lime-sulphur or Bordeaux mixture, this can be done without wholly destroying the characteristics of the nicotine insecticide, and with considerable advantage by the use of a slight excess of the hydrocarbon ammonium sulphonates beyond that required to react with all the nicotine sulphate or other nicotine salt. In order to handle this sticky substance, which may be a "complex" containing calcium, nicotine and the sulphonates, through the strainer and nozzle of a spraying apparatus it is advisable to have some finely divided solid material present, such as clay or lime. In the case of Bordeaux mixture, the fungicide itself provides the finely divided solid matter, but when the new insecticide is to be used with lime-sulphur solution the solid matter must be supplied,—preferably a clay-like material, as the less caustic the spray the more nicotine will be retained.

For example, a good adherent and fairly durable insecticide material carrying lime-sulphur as a fungicide may be made according to the following formula:

| | | |
|---|---|---|
| Hydrocarbon ammonium sulphonates— 50% solution | gallon | ½ |
| Nicotine sulphate (40% nicotine) | pint | 1 |
| Inert clay | pounds | 5 |
| Commercial lime sulphur solution | gallons | 2½ |
| Water to make a total of | do | 100 |

In preparing this, the hydrocarbon ammonium sulphonate is first supplied to say half of the water, for example, in the tank of an ordinary spraying machine having an agitator; then the nicotine sulphate or other nicotine salt followed by the clay are added and the whole agitated for a few minutes, say for example, five minutes. Finally the lime-sulphur in its usual liquid form is slowly added to the mixture in the tank, with strong agitation, the balance of the water being added at the same time. Then the insecticide material is applied, as by spraying, to the plants, while maintaining the agitation.

A spray compounded in accordance with the above formula has two important advantages over the usual formula, consisting of nicotine sulphate, lime-sulphur solution and water; in that, it holds a portion of the nicotine as a poisonous film for a considerable period, whereas in the usual formula all of the nicotine vaporizes at once, and, that the surface tension of the spray solution is lowered to give better spreading and wetting of plants and insects. The former allows the spray to be used against certain caterpillars, such as the codling moth larvae, thus eliminating the need for an arsenical in some cases, and the latter makes the spray more effective as an aphiscide. The proportions in the above formula are dictated by the assumed need for a fungicide of the usual summer strength of lime-sulphur solution of one to forty. If a fungicide is not needed, or elemental sulphur can be used, more effective use of the nicotine as an insecticide may be had by substituting a small amount,—four ounces—of hydrated lime for the lime-sulphur solution.

To bring about the formation of the above-mentioned "sticky substance" to a more marked degree and at the same time preserve the fixation of the nicotine, a soluble salt of a heavy metal such as iron, aluminum, zinc or copper, may be used. In the case of copper a definite complex or double sulphonate is formed with the nicotine, which is very sticky, only slightly soluble, and is very resistant to wash off. Biological tests have shown that this copper-nicotine sulphonate-complex is more effective against codling moth larvae than similar mixtures without copper.

For example, a highly adherent and persistent insecticide material may be made according to the following formula:

| | | |
|---|---|---|
| Hydrocarbon ammonium sulphonate (50% solution) | gallon | ½ |
| Nicotine sulphate (40% nicotine) | pint | 1 |
| Inert clay | pounds | 8 |
| Copper sulphate (bluestone) | do | ¼ |
| Water to make | gallons | 100 |

In preparing this spray the hydrocarbon ammonium sulphonate is first dissolved in the partly filled tank; then the nicotine sulphate and clay are introduced; and finally the copper sulphate is added, having first dissolved it in a little water; the agitator should be kept running during the entire operation including the addition of the balance of the water to make 100 gallons and until the tank is emptied by spraying.

There is disclosed in the foregoing a number of insecticide preparations which have characteristics in common but which differ from each other in the length of time a poisonous film produced by them would persist. The relative persistence of this film or coating is governed by three factors; volatility, solubility and adherence of the nicotine compound contained therein. These factors can be varied at will to a large extent and the particular insecticide material which is to be applied at a given time will depend upon the insect or group of insects to be controlled, the need as to a fungicide, the geographical location, the climate, the time of the year, etc.

Especially where it is desired to obtain a highly insoluble insecticide, an exceedingly advantageous insecticide material is obtained by combining the hydrocarbon ammonium sulphonates, and nicotine salt with a finely powdered alumino-silicate carrying a metal more electro-positive than the aluminum, for example, a metal or metals of the alkalis or of the alkaline earths, such for example, as calcium, magnesium, sodium or potassium. There are some naturally occurring minerals known as fuller's earth, and particularly that type of materials called bentonites, which in finely ground condition are particularly suitable for addition to the reaction products of hydrocarbon ammonium sulphonates and nicotine salts. Where bentonites are to be used, however, it is important to know the analysis of the bentonite, because it has been found that there is a material sometimes called a bentonite which is a derivative of alumino-penta-silicic acid, which reacts with nicotine compounds to form a very valuable nicotine alumino-penta-silicate, which is practically insoluble in water and if such material is used with the hydrocarbon ammonium sulphonates and a nicotine salt, the latter should be supplied in sufficient quantity to satisfy the alumino-penta-silicate and also most, but not all of the hydrocarbon ammonium sulphate. The products of this reaction are exceedingly valuable as an insecticide because of the presence of two nicotine compounds as well as one or more sodium, potassium, calcium or magnesium sulphonates of the hydrocarbons, serving as an adhesive material.

An important physical characteristic of the type of bentonites suitable for use in this invention is that it does not readily and promptly disperse when it is mixed with water. On the contrary, when wet with water it swells greatly and becomes a jelly-like mass, which when agitated with a considerable amount of water, breaks up into smaller gelatinous lumps and these lumps resist further disintegration for a considerable time. It is necessary to treat the bentonite as hereinafter described, before it can be added to the spray tank. A further chemical characteristic of a suitable bentonite is that it contains an alkali metal, sodium or potassium or both, which is easily replaceable with nicotine directly, or by an alkaline earth metal, or by some of the heavier metals, such as copper, zinc or iron, such metals being in turn easily replaceable by nicotine. In general, this chemical replacement takes place more promptly and completely with the chlorides of the metals than with the sulphates, but with nicotine the reaction takes place immediately with any of its salts, including nicotine sulphate. After the replacement of the alkali metal in the bentonite, or a substantial part of it, with another metal or with nicotine, the product does not swell appreciably when wet with water and may be promptly dispersed therein in finely divided form by the usual methods of agitation. This replacement may be brought about by intimately mixing or preferably grinding together the substantially dry bentonite with three to ten percent of its weight of a salt of a metal or nicotine or an equivalent amount of a concentrated solution of the same. In the former case the actual replacement may not take place until the mixture is wet with water.

For example, 97 parts of the preferred type of bentonite (i. e. the one consisting largely of alumino-penta-silicates) and three parts of calcium chloride may be ground together in a ball mill for half an hour. The resulting product is easily wet and may be promptly dispersed in water in the spray tank. Upon the addition of a nicotine salt to this dispersed bentonite product, insoluble nicotine alumino-penta-silicate immediately forms in a fine state of subdivision. For substantially complete fixation of the nicotine, the proportions should be eight parts by weight of the bentonite-calcium chloride preparation to one part of a nicotine salt solution containing 40% of nicotine. Or, the nicotine alumino-penta-silicate may be made in powdered form and then dispersed in water to form a spray as follows:

A nicotine salt solution of 40% nicotine strength, most advantageously nicotine sulphate, may be roughly mixed with the dry bentonite of the said penta-silicate type, and the mixture ground together in a ball mill, in the proportion of one part of the former to eight of the latter.

An insecticide spray containing the nicotine alumino-penta-silicate prepared by either of the above methods is in itself a fairly effective control for codling moth larvae and similar insects, but it is preferably used with some spreader material such as skimmed milk, the various textile wetting-out agents, among which are sulphonated castor oil, sulphonated abietic acid and the sulphonated higher alcohols, but more particularly with hydrocarbon ammonium sulphonates, because of the presence in this latter case of the two fixed nicotine compounds. A fungicide, such as lime-sulphur solution or elemental sulphur may be used with the above insecticides if required. A form of elemental sulphur which has given good results in the field is one known on the market as "Kolofog". "Kolofog" is a mixture or combination of sulphur and that type of bentonite suitable for the preparation of the above insecticide. It disperses in water as finely divided sulphur and finely divided bentonite so that the addition of a nicotine salt to this dispersion produces nicotine alumino-penta-silicate. The following formula has been used with success in the control of codling moth on apples:

| | |
|---|---|
| Bentonite-sulphur _____ pounds__ | 8 |
| Nicotine sulphate (40% nicotine) ____ pint__ | 1 |
| Hydrocarbon ammonium sulphonates (50% solution) _____ quart__ | 1 |
| Water _____ gallons__ | 100 |

A good formula for an insecticide material using a material whose analysis shows it to be a derivative of alumino-penta-silicic acid containing metals of the alkalis and alkaline earths, such, for example, as the material on the market known as Volclay or Wilkinite, is as follows:

| | |
|---|---|
| Hydrocarbon ammonium sulphonate (50% solution) _____ quart__ | 1 |
| Nicotine sulphate (40% nicotine) _____ pint__ | 1 |
| Volclay or Wilkinite containing 3% of calcium chloride _____ lbs__ | 4 to 8 |
| Water _____ gallons__ | 100 |

The exact amount of the Volclay or Wilkinite preparation which is used will depend on the relative amount of nicotine alumino-penta-silicate it is desired to form. The addition of a fourth of a pound of copper sulphate to the above formula will result in the formation of some of the above-mentioned "sticky" complex of copper, nicotine and hydrocarbon sulphonate, which together with the nicotine alumino-penta-silicate produces a most effective and persistent insecticide.

A similar formula may be prepared in the dry, powdered form by mixing together, then drying and grinding the following:

| | Pounds |
|---|---|
| Hydrocarbon ammonium sulphonates (50% solution) _____ | 24 |
| Nicotine sulphate (40% nicotine) _____ | 20 |
| Volclay or Wilkinite _____ | 80 |

The weight, after drying, of the above formula is 100 pounds and it contains 8% by weight of nicotine. Used at the rate of five pounds per one hundred gallons of water, it is an effective insecticide. The addition of a small amount of copper sulphate gives this insecticide the additional advantages already pointed out in the "tank-mix" method of preparation.

Instead of using the nicotine in the form of an extract from tobacco, or a salt thereof, it is often advantageous to use the tobacco material itself, most advantageously in a finely comminuted or dust form and combine this with the ammonium hydrocarbon sulphonate to produce the desired insecticide material. In this case the tobacco material not only supplies the nicotine, but also the soluble calcium, magnesium, potassium and sodium salts, so that the tobacco dust reacts with said ammonium sulphonates to form the required nicotine insecticide compounds as well as the spreading and sticking complexes. The tobacco dust has the additional advantage that it contains soluble gums and pectin matter which increases the effectiveness of the spray against certain insects.

When using tobacco dust it is to be supplied to the ammonium hydrocarbon sulphonates in such proportion that it will supply the nicotine to the same extent as set forth in the preceding formulae.

Obviously, the amount of tobacco dust to be employed depends upon the amount of nicotine which it carries and this varies, but can be readily determined by analysis.

What is claimed is:

1. An insecticide material consisting of the reaction products of nicotine and a readily water soluble petroleum hydrocarbon-sulphonate of ammonium.

2. An insecticide material comprising the reaction products of water-soluble petroleum hydrocarbon ammonium sulphonates, nicotine, and a water-soluble salt of a metal selected from the group; copper, zinc, aluminum, iron.

3. An insecticide material comprising the reaction products of water-soluble petroleum hydrocarbon ammonium sulphonates, nicotine, and a water-soluble salt of a metal selected from the group; copper, zinc, aluminum, iron, with an inert finely divided solid.

4. An insecticide material comprising the reaction products of petroleum hydrocarbon ammonium sulphonates, alumino-penta-silicates containing alkali metals, and a nicotine compound.

5. An insecticide material comprising the reaction products of water-soluble petroleum hydrocarbon-ammonium sulphonates, a nicotine salt, a water-soluble salt of copper, and a compound of alumino-penta-silicates of the alkalies.

6. An insecticide material consisting of the reaction products obtained by combining

| | |
|---|---|
| Hydrocarbon ammonium sulphonate (50% solution) _____ quart__ | 1 |
| Nicotine sulphate (40% solution) __ pint__ | 1 |
| Natural complex salt of penta-silicic acid containing alkalis and alkaline earths (known as Volclay or Wilkinite) containing 3% of calcium chloride ____ lbs__ | 4 to 8 |
| Copper sulphate _____ do ____ | ¼ |
| Water _____ gals__ | 100 |

WARREN MOORE.
ROBERT B. ARNOLD.